No. 642,838. Patented Feb. 6, 1900.
A. P. COCHRANE.
PNEUMATIC TIRE.
(Application filed Feb. 6, 1897. Renewed Mar. 31, 1899.)

(No Model.)

Witnesses.
A. B. Mattingly
Fred J. Dole.

Inventor.
Albert P. Cochrane.
By his Attorney
F. H. Richards.

THE NORRIS PETERS CO., PHOTO-LITHO., WASHINGTON, D. C.

UNITED STATES PATENT OFFICE.

ALBERT P. COCHRANE, OF NEW YORK, N. Y.

PNEUMATIC TIRE.

SPECIFICATION forming part of Letters Patent No. 642,838, dated February 6, 1900.

Application filed February 6, 1897. Renewed March 31, 1899. Serial No. 711,320. (No model.)

*To all whom it may concern:*

Be it known that I, ALBERT P. COCHRANE, a citizen of the United States of America, residing at New York, in the county of New York and State of New York, have invented certain new and useful Improvements in Pneumatic Tires for Bicycles or other Vehicles, of which the following is a specification, reference being had therein to the accompanying drawings.

This invention relates to improvements in pneumatic tires for velocipedes, bicycles, and other vehicles, the object being to produce a tire which will be of light and durable construction and which will be what is commonly known as "self-healing"—that is to say, will possess the property of remaining air-tight after being punctured.

Figure 1:
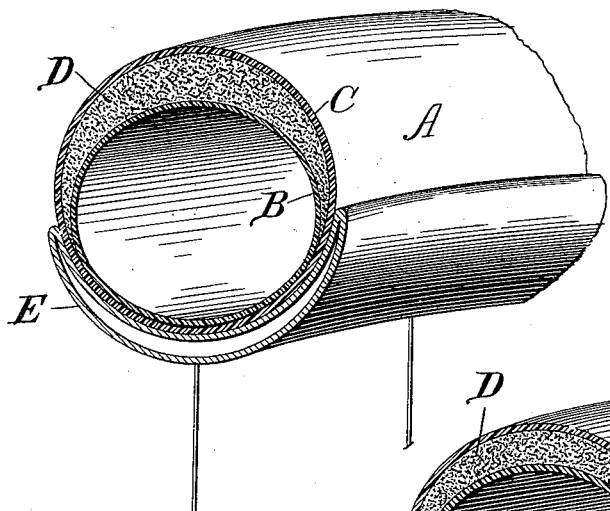
Figure 2:
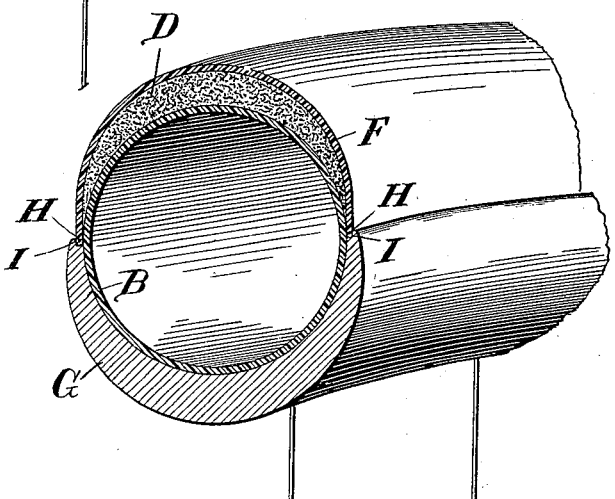
Figure 3:
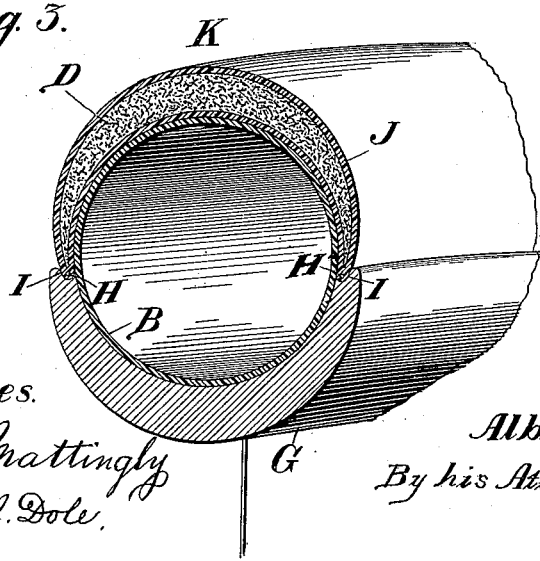

In the drawings accompanying and forming part of this specification, Figure 1 is a cross-sectional view of a wheel-rim with one form of my improved tire in position thereon, the rim or felly in this form being illustrated as a metallic formation. Fig. 2 is a cross-sectional view of another form of my improved tire, shown in this instance attached to a wooden rim or felly; and Fig. 3 is a cross-sectional view of still another form of my improved tire, likewise shown attached to a wooden rim or felly.

Similar characters of reference designate like parts in all the figures of the drawings.

In the construction of this improved tire I employ in the tread thereof some suitable material which will prevent the escape of air when the tire is punctured, and in the preferred construction I preferably employ what is known as "sponge-rubber" or rubber in a cellular condition. Rubber of this kind is extremely light in weight, and by reason of its spongy consistency when perforated the edges will close to prevent the escape of the air.

I prefer to employ the sponge-rubber as an armor in connection with an inner tube and an outer shoe, although I may use it with good effect in the construction of a single-tube tire.

Referring more particularly to Fig. 1 of the accompanying drawings, the tire A is shown comprising an inner tube B, an outer tube or shoe C, and a layer or armor of some suitable material, such as sponge-rubber, D. The armor D is preferably thicker at its center or tread portion of the tire and tapers to a point at its edges. The inner and outer tubes of the tire are preferably in juxtaposition throughout the area of the rim E, (shown herein as concaved,) whereby it will be seen that the sponge-rubber D is confined in a crescent-shaped chamber between the tubes B and C, and may, if desired, be united by cement to such tubes B and C to form a continuous tire of the "hose-pipe" class.

This improved tire may be cemented or otherwise secured to the rim E, which is illustrated in Fig. 1 as of metallic formation.

Referring to Figs. 2 and 3, the invention is shown embodied in a tire of the "double-tube" class, the armor D being shown in this instance as interposed between the inner or air tube B and the outer shoe F, which shoe in the form shown is less than a complete tube and is detachably secured to the rim G in some suitable manner. In the form shown it is secured to the rim by the wires H, which are provided with suitable turnbuckles or other equivalent devices for tightening said wires in the channels I of the rim G, which in this instance is shown as a wooden rim. In this construction the armor D is preferably detachable from both the inner tube and outer shoe, being held in place in a crescent-shaped chamber by the pressure of the air, the points of the crescent terminating adjacent to the edges of the concaved wheel-rim G.

In Fig. 3 the armor is shown entirely enveloped or inclosed in a cover J of some suitable material, and combined with such armor forms a detachable shoe K. The armor and cover in this case may be cemented or otherwise united, if desired. In this form it will be seen that the shoe I comprises a plurality of layers forming a crescent-shaped chamber adapted to partially encircle the inner inflatable tube.

From the foregoing it will be readily seen that my improved inflatable tire comprises in a general way a plurality of layers or tubes bearing one upon another and having within the same a chamber crescent-shaped in cross-section and containing a filling of some suitable material adapted to prevent the escape of air on the puncturing of the tire, and which material in the present instance is shown as sponge-rubber, and which crescent-shaped chamber in the preferred form shown has the points of the crescent located adjacent to the edges of the wheel-rim. By this construction the armor D is of considerable thickness at the tread of the tire, so that the inner or air tube will not readily be punctured, this thickness of the tire being obtained without unduly affecting the weight or resiliency of the tire owing to the lightness and compressibility of the material which may be used—such, for instance, as sponge-rubber.

It will be seen that if the tire is punctured the edges of the puncture or cut will, by reason of the spongy nature of the armor, close together to prevent the escape of air from the inner tube, and this action will be materially augmented by the fact that the sponge-rubber will be kept under compression by the air contained in the inner tube.

In the forms shown in Figs. 2 and 3 the outer shoe may be readily removed and the inner tube patched or mended, if desired, although ordinarily this will not be necessary.

It is to be understood that various changes may be made in the details of construction without departing from the general scope and spirit of my invention.

Having described my invention, I claim—

1. The combination, with a wheel-rim, of a pneumatic tire comprising an inner inflatable tube, and an outer shoe or tread consisting of a tube folded to crescent shape in cross-section and containing a filling of sponge-rubber, and means for securing the folded shoe to the rim.

2. The combination, with a wheel-rim provided with edge grooves, of a pneumatic tire comprising an inner tube and an outer tube or shoe having a filling of sponge-rubber, the folded edges of said outer tube or shoe resting in the grooves of the wheel-rim and provided with openings to receive securing-wires.

3. As an improvement in pneumatic tires for use in concaved wheel-rims, the combination, with an air-tube, of a tread-layer forming between said air-tube and said layer a cushion-receiving space of crescent-shaped cross-sectional form having the greatest width at the tread of the tire and gradually decreasing in width toward the edges of said space, said edges being located adjacent to the points where the tire joins the edges of said concaved wheel-rim; and an elastic cushioning material—such as sponge-rubber—filling said crescent-shaped space and terminating in thin edges at the sides of the tire contiguous to the point where the tire bears against the rim edges, whereby the effect of the cushioning material is gradually reduced from the center of the tread toward the sides of the rim and terminates adjacent to the edges of said rim, substantially as described.

4. The combination, with a wheel-rim concaved in cross-section, of a pneumatic tire comprising an inner inflatable tube the walls of which are of the same thickness throughout; a tread or shoe comprising a completely-formed tube the walls of which are likewise of the same thickness throughout and so disposed with relation to said inner tube that one part of said tread-tube is in engagement with a portion of said inner tube while another part thereof is free of engagement therewith and constitutes the tread of the tire and forms intermediate the same and said inner inflatable tube a cushion-receiving chamber of crescent shape cross-sectional form having the greatest width at the tread of the tire and gradually decreasing in width toward the edges of said chamber, said edges being located adjacent to the points where the tire joins the edges of such concaved wheel-rim and where the outer tube engages the inner tube; and a sponge-rubber cushioning material filling said crescent-shaped chamber and terminating in thin edges at the sides of the tire adjacent to the points where the tire bears against the rim edges, whereby the effect of the cushioning material is gradually reduced from the center of the tread toward the sides of the rim and terminates adjacent to the edges of said rim, substantially as described.

5. A pneumatic tire comprising an inner inflatable tube; an outer shoe or tread comprising a tube folded to form a chamber crescent-shaped in cross-section; and a cushioning material in said chamber.

In testimony whereof I affix my signature in presence of two witnesses.

ALBERT P. COCHRANE.

Witnesses:
H. C. EVERT,
GEO. B. PARKER.